United States Patent [19]
Watrous

[11] Patent Number: 5,130,874
[45] Date of Patent: Jul. 14, 1992

[54] DISK FILE ACTUATOR WITH HEAT DISSIPATION AND SIMPLIFIED COMPONENT MOUNTING

[75] Inventor: Robert B. Watrous, San Jose, Calif.

[73] Assignee: International Business Machines Corporation, Armonk, N.Y.

[21] Appl. No.: 652,700

[22] Filed: Feb. 7, 1991

[51] Int. Cl.$^5$ .......................... G11B 5/55; G11B 21/08
[52] U.S. Cl. .................................. 360/106; 360/98.01
[58] Field of Search ............... 360/106, 109, 104, 103, 360/98.01

[56] References Cited

U.S. PATENT DOCUMENTS

| | | | |
|---|---|---|---|
| 4,392,163 | 7/1983 | Rijckaert et al. | 360/109 X |
| 4,730,227 | 3/1988 | Chong et al. | 360/106 |
| 4,992,684 | 2/1991 | Matsui | 360/106 X |

FOREIGN PATENT DOCUMENTS 2212971 8/1989 United Kingdom .................. 360/106

OTHER PUBLICATIONS

IBM/TDB vol. 19, No. 5, Oct. 1976, pp. 1859-1860 "Transducer Assembly to Circuit-Board Interconnect" by Burns et al.

*Primary Examiner*—Aristotelis Psitos
*Attorney, Agent, or Firm*—Henry E. Otto

[57] ABSTRACT

An actuator assembly for a magnetic recording disk file and method of fabricating same. A sleeve surrounds and is axially moveable relative to a stator to control the axial position of a head/arm assembly relative to a magnetic recording disk. The sleeve is separated from said stator by a gas-bearing film. Electronic circuit components are mounted on a canister that surrounds said sleeve and is substantially thermally isolated from said sleeve to dissipate heat generated by said components. The canister is in the form of a hollow rectangle which surrounds the rectangle sleeve with clearance and is secured to the sleeve at a minimum number of points to permit cooling air to flow through the clearance space with minimal obstruction. A flexible flat conductive input/output cable is secured to three sides of the canister, and a flexible flat conductive power cable is secured to the remaining side of the canister.

9 Claims, 3 Drawing Sheets

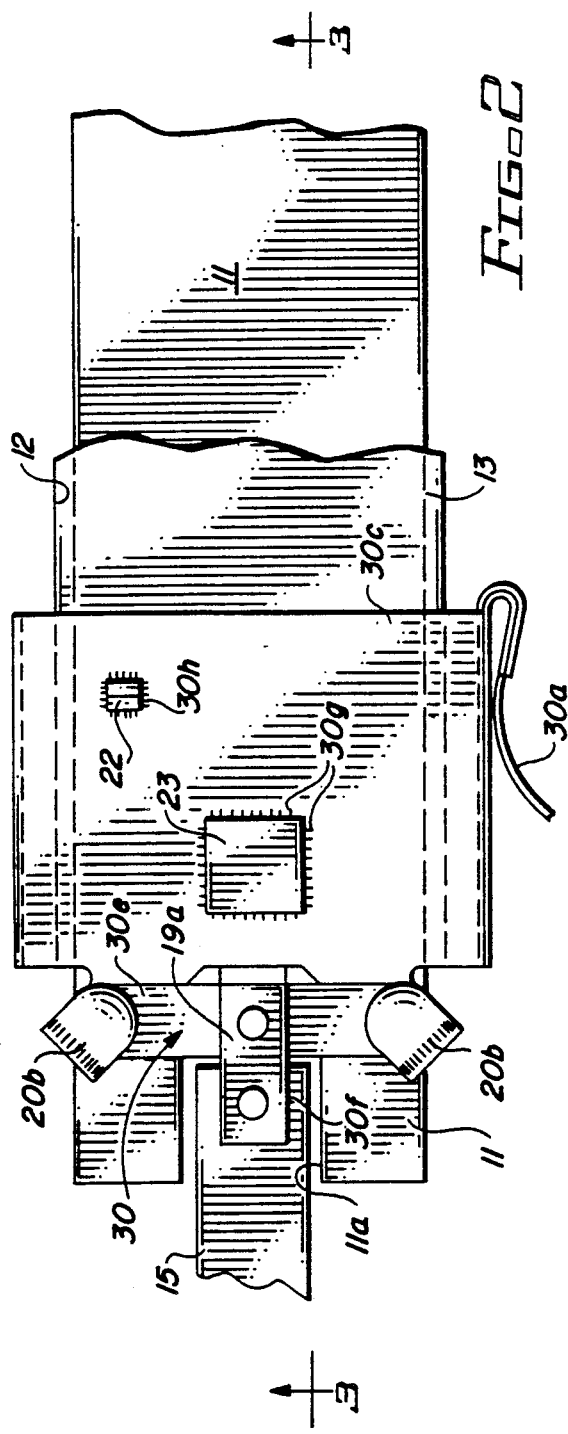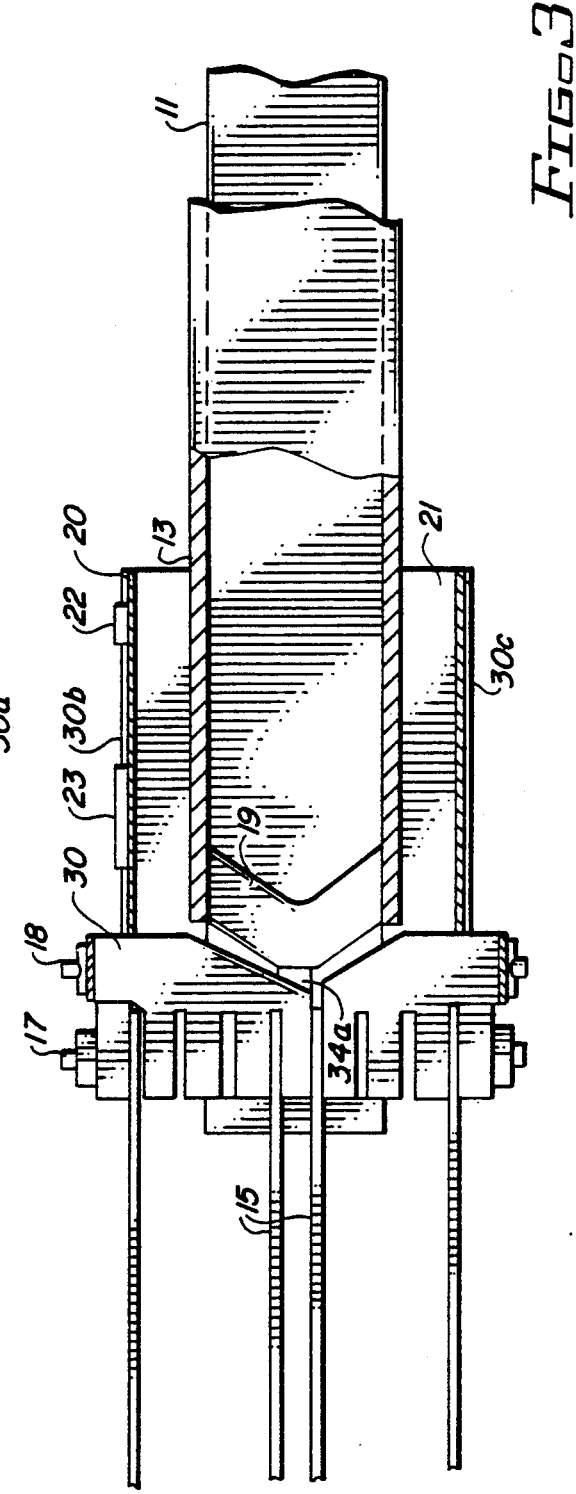

DISK FILE ACTUATOR WITH HEAT DISSIPATION AND SIMPLIFIED COMPONENT MOUNTING

This invention relates to an actuator assembly for a magnetic recording disk file and method of fabricating same, and more particularly, to an actuator assembly of said type with improved heat dissipation and simplified component mounting.

BACKGROUND OF THE INVENTION

As magnetic recording disk files become more and more compact, heat dissipation from electronic circuit components becomes an increasingly serious concern. In actuator assemblies heretofore proposed, it has been customary to dissipate heat via an aluminum block that is attached to and supports at least one head/arm assembly. However, this heat dissipation technique can cause thermal distortion of the head-supporting arms of the assembly.

Commonly assigned co-pending U.S. application Ser. No. 07/510,484, filed Apr. 18, 1990, discloses an actuator assembly comprising a sleeve that is mounted over, and slides with clearance over, a stator that has ports for delivering pressurized air to the clearance space to create an air-bearing. However, this configuration does not provide cooling air to dissipate heat generated by the various electronic circuit components.

There is a need for an improved actuator assembly wherein (1) an element, such as a canister, that is not connected directly or indirectly to the head-supporting arms of the actuator assembly, dissipates the heat generated by electronic circuit components so that heat is not transmitted to said arms and thermal distortion is thereby avoided; (2) the canister is mounted with clearance over a stator-surrounding sleeve and attached thereto at a minimum number of points to permit cooling air to flow through the clearance space to enhance heat dissipation; and (3) a flat conductive cable that provides electrical connections to the head/arm assembly is secured to only three sides of the canister to simplify mounting of components and reduce the length of the leads between the heads and circuit components.

SUMMARY OF THE INVENTION

An actuator assembly for a magnetic recording disk file and method of fabricating same is disclosed. A sleeve surrounds and is axially moveable relative to a stator to control the axial position of a head/arm assembly relative to a magnetic recording disk. The sleeve is separated from said stator by a gas-bearing film. Electronic circuit components are mounted on a canister that surrounds said sleeve and is substantially thermally isolated from said sleeve to dissipate heat generated by said components. The canister is in the form of a hollow rectangle which surrounds the rectangular sleeve with clearance and is secured to the sleeve at a minimum number of points to permit cooling air to flow through the clearance space with minimal obstruction. A flexible flat conductive input/output cable is secured to three sides of the canister, and a flexible flat conductive power cable is secured to the remaining side of the canister.

BRIEF DESCRIPTION OF THE DRAWINGS

FIG. 2 is a top view, partially broken away, of the assembly of FIG. 1;

FIG. 3 is a longitudinal sectional view, partially broken away, taken along the line 3—3 of FIG. 2;

DESCRIPTION OF PREFERRED EMBODIMENTS

Figure 1:
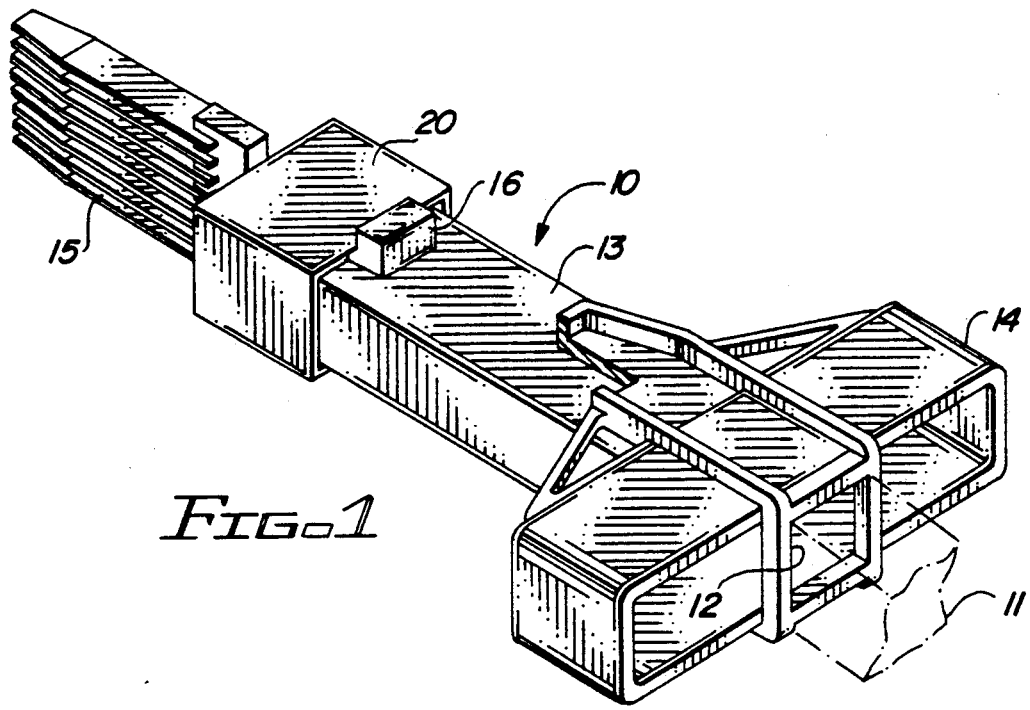
FIG. 1 is an isometric view of an actuator assembly embodying the invention.

As illustrated in FIG. 1, the actuator assembly 10 embodying the invention comprises a stationary, rectangular stator 11 extending axially thereof and preferably slotted at 11a (FIG. 2) and configured in the manner described in the above-cited co-pending application. Stator 11 is slidably disposed with external clearance within a longitudinal rectangular opening 12 defined between the stator and a sleeve 13 (preferably of glass) so as to provide a pressurized air-bearing film between the sleeve and stator. Assembly 10 also comprises a coil 14 surrounding one end of stator 11 and of sleeve 13 to which it is attached. A plurality of arms 15 support, adjacent their outer ends, one or more magnetic transducers or heads (not shown). Movement of sleeve 13 is limited by a stop 16 to define the point of maximum extension of the arms 15 and hence of the heads toward the center of a magnetic recording disk (not shown).

As best shown in FIG. 3, the arms 15 are held together as a stack by two through bolts 17, 18 and attached to the sleeve 13 by an insert 19 bonded to the inside of sleeve 13. An extension 19a on the insert engages the center of the arm stack which nests in the slot 11a in stator 11.

According to a feature of the invention, and as best shown in FIGS. 2 and 3, a hollow rectangular canister 20, preferably of aluminum, surrounds the rectangular sleeve 13 with substantial external clearance. Canister 20 is attached to sleeve 13 at a minimum number of points to provide a hollow rectangular channel 21 through which cooling air may flow to dissipate heat generated by electrical circuit components, such as a servo chip 22 and data chips 23, which are bonded to the exterior of the canister. Note that because canister 20 is completely thermally isolated (except at the aforementioned minimum number of attachment points) heat from the circuit components, such as 22, 23, is dissipated into the canister rather than into the sleeve. This prevents heat from being transmitted via the sleeve to the head-supporting arms 15 and avoids thermal distortion thereof.

Before completing the description of the actuator assembly 10 and how it is fabricated, it will be helpful to first describe the unique configuration of a flexible flat conductive input/output (I/O) cable 30 and how it is formed.

Figure 4:
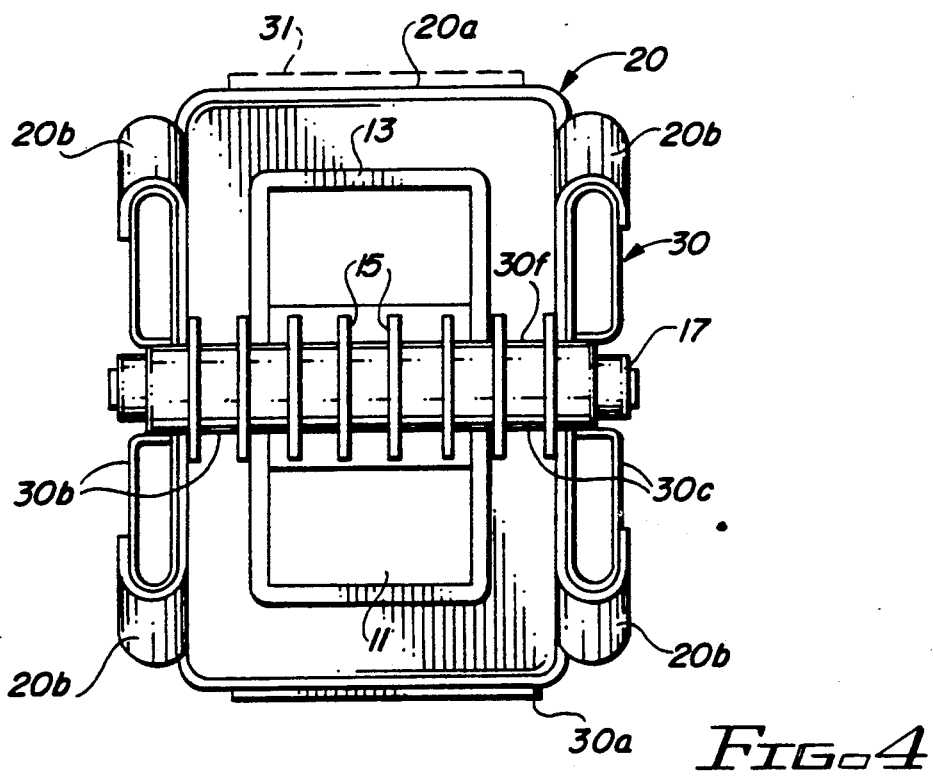
FIG. 4 is an end view of the assembly shown in FIG. 2.
Figure 5:
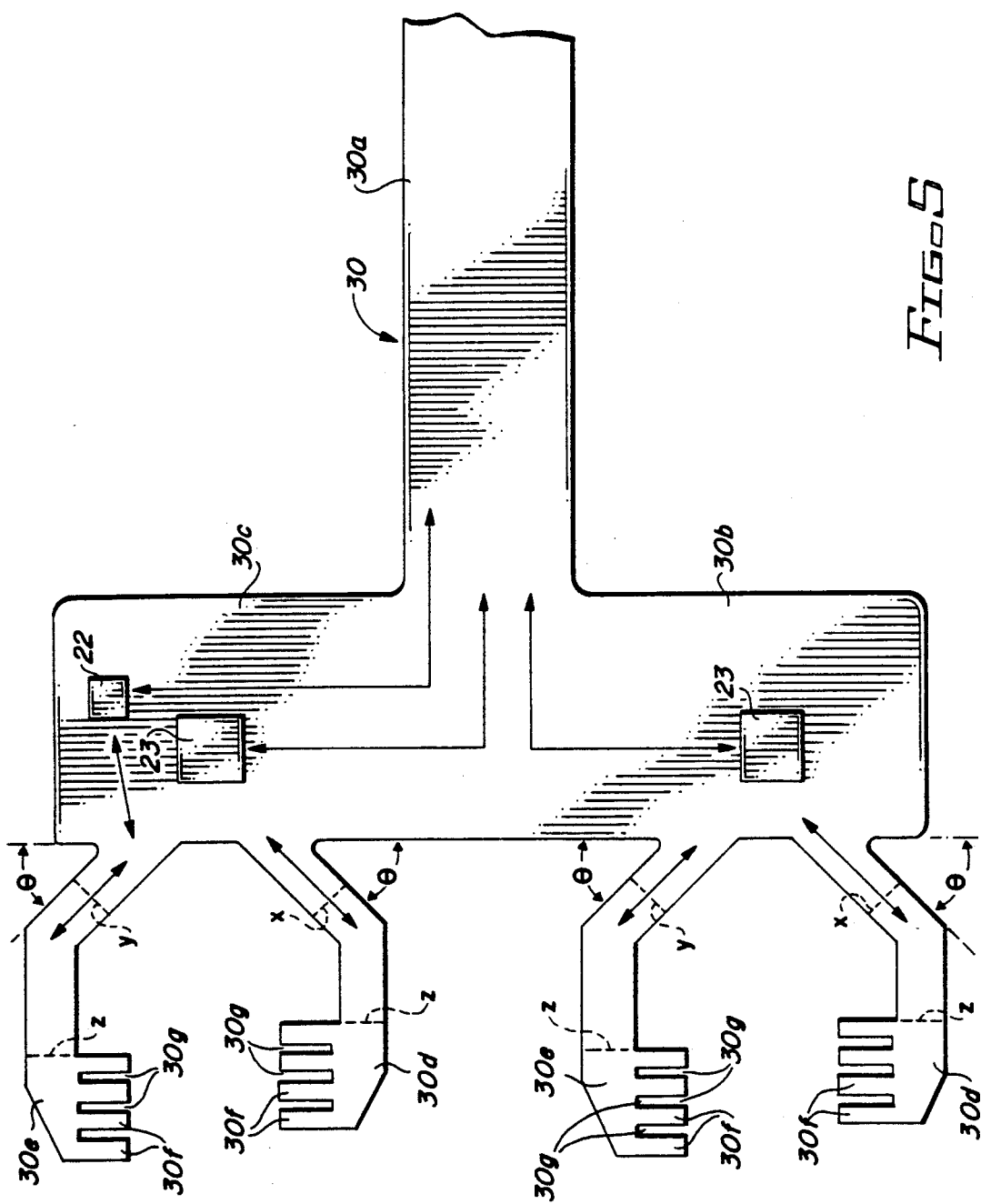
FIG. 5 is a plan view, to enlarged scale, of a flat flexible conductive cable, prior to forming and attachment to the actuator assembly, to show its unique configuration and how it is formed to implement the invention.

According to a feature of the invention, cable 30 is roughly T-shaped with a longitudinally extending I/O loop portion 30a for receiving/returning electrical signals, and two portions 30b, 30c perpendicular to loop portion 30a. A pair of generally U-shaped substantially mirror-image portions 30d, 30e comprise respective extensions that project oppositely at a preselected angle θ (45 degrees) from, and are formed integrally with, a lateral edge of each respective portion 30b, 30c that is remote from the portion 30a. As best shown in FIG. 4, at the outermost part of each extension, portions 30d, 30e have a plurality of leads 30f (four, as illustrated) separated by substantially parallel slots 30g for engagement with corresponding ones of the arms 15. However, as will be noted in FIG. 5, portions 30e are slightly longer than portions 30d so that the respective leads 30f of portions 30d are offset with respect to those of portions 30e.

To achieve engagement in this manner, the portions 30d, 30e of flat cable 30 are first curved upward and backward into a 180-degree loop generally about lines x and y, respectively, which are perpendicular to the aforementioned extensions, so that said portions will then generally overlie each other. The substantially mirror portions 30d, 30e containing the leads 30f are now folded, this time downward along line z, to cause the lead-containing portions of 30d, 30e to face and be parallel to each other and thus be perpendicular to the plane of the remainder of cable 30. The arrow-tipped lines in FIG. 5 indicate schematically just a few of the many two-way conductive paths between the I/O loop portion 30a and the chips 22, 23 and leads 30f.

Assume now that the cable has been formed in the manner just described following the successive looping in the area of lines x and y and then folding at z. According to another feature of the invention, and as shown in FIGS 2, 3 and 4, cable 30 is secured around only three sides of the hollow rectangular canister 20. More specifically, and as viewed in FIG. 2, I/O loop portion 30a is mounted to the bottom face of canister 20; portion 30c is mounted to the front side face; portion 30b is mounted to the rear side face, which is not visible; and the top face 20a is not contacted by the cable 30. This permits a terminal loop part of a separate flexible flat conductive power cable 31 to be mounted on this top side 20a to provide connections to coil 14.

As shown in FIGS. 2 and 3, the chips 22, 23 (only one shown) and capacitors (not shown) are higher than the thickness of cable 30 and project exteriorly of portions 30b and 30c to permit the chips to be connected to conductive pads 30g and 30h on the cable extending to the edges of the chip-accommodating apertures in the cable.

As best seen in FIGS. 2 and 4, the 180 degree loops of the portions 30d, 30e are retained within tabs 20b formed integrally with the canister 20 and projecting outwardly therefrom at the 45-degree angle θ. The lead 30f extend downwardly perpendicular to the plane of the paper as viewed in FIG. 2. As now viewed in FIG. 4, the cable portion 30b (or 30c) starts flush with and is bonded to a side of the canister 20. Then portions 30d, 30e are looped the 180 degrees and confined by tabs 20b, which straddle the arms 15. Next, the lead-containing portions of 30d, 30e extend perpendicular to the plane of the paper and along one side of the stack of arms 15; and leads 30f of each portion pair 30d and 30e interleave with and contact alternate sides of the arms, which extend into the slots 30g.

It will now be seen that the canister 20 is smaller than the stack of arms 15. Also, since the cable 30 does not cover any of the annular channel 21 between the canister and sleeve, unobstructed flow of cooling air is possible through the channel to carry away heat generated by the chips 22, 23. Since the 180-degree cable loops and the restraining canister tabs 20b straddle the stack of arms 15, the entire space behind the stack is available for the canister. This desirably enables the canister to be of minimum length and weight. Also, the canister 20 which supports the cables 30, 31 and chips 22, 23 is, in turn, supported only at a minimum number of points adjacent its axial ends. This minimizes head transfer from the chips to the sleeve. Finally, the length of the leads between the respective heads and electronic circuit components is desirably minimized.

While the invention has been shown and described with respect to a preferred embodiment thereof, it will be understood by those skilled in the art that changes in form and detail may be made in this embodiment without departing from the scope and teaching of the invention. Accordingly, the actuator assembly and method herein disclosed are to be considered merely as illustrative, and the invention is to be limited only as specified in the claims.

We claim:

1. An actuator assembly for a magnetic recording disk file, said assembly comprising:
   a stator;
   a sleeve surrounding and axially moveable relative to said stator and separated from said stator by a gas-bearing film;
   circuitry including electronic circuit components; and
   a canister surrounding said sleeve and supporting said circuit components and substantially thermally isolated from said sleeve to dissipate heat generated by said components.

2. The actuator assembly of claim 1, wherein said canister surrounds said sleeve with clearance and is secured to said sleeve at a minimum number of points to permit cooling air to flow through the clearance space with minimal obstruction.

3. The actuator assembly of claim 1, wherein the canister is in the form of a hollow rectangle, and including:
   a flexible flat conductive input/output cable secured to three sides of the canister; and
   a flexible flat conductive power cable secured to the remaining side of the canister.

4. An actuator assembly for a magnetic recording disk file comprising
   a hollow rectangular canister;
   a plurality of arms, each supporting at least one magnetic recording head and having signal conducting leads;
   a flexible flat conductive input/output cable secured around three sides of the canister and having conductive pads on at least one of said sides, said cable having at least one pair of integrally formed substantially mirror image portions that project at a preselected angle from one longitudinal edge of the cable, the outermost parts of each portion having a plurality of leads separated by substantially parallel slots and each portion intermediate its ends being so looped back over itself and then folded over and down as to cause said outermost parts to extend perpendicular to the plane of the flat cable and at right angles to said one longitudinal edge such that the leads interleave with corresponding leads of said arms via the slots;
   a servo chip and at least one data chip bonded to the exterior of said canister and having terminals for connection with corresponding pads on said cable;
   a stator; and
   a sleeve movably mounted over the stator, said canister surrounding said sleeve with clearance and attached at minimal points to allow cooling air to pass through the clearance space.

5. The actuator assembly of claim 4, wherein one image portion of each pair extends slightly more than the other at said preselected angle for causing the leads of said one image portion to be offset relative to the leads of said other portion such that the leads of each mirror portion will engage opposite side surfaces of alternate ones of said arms.

6. The assembly of claim 4, wherein the cable comprises one extension in the direction of the axis of the canister having one part attached to the exterior of one of said three sides of the canister and the remaining part free of connection and long enough to create a flexible input-output loop.

7. The assembly of claim 5, including a power cable having an extension in the direction of the axis of the canister, one part of which extension is attached to the exterior of a fourth side of the canister and the remaining part of which is free of connection and long enough to create a flexible power loop.

8. A method of fabricating an actuator assembly for a magnetic recording disk file, said method comprising the steps of:
   mounting a sleeve over a stator for axial movement relative thereto, to control axial position of a head/arm assembly relative to a magnetic recording disk; and
   mounting electronic components on a canister that surrounds the sleeve with a substantial clearance space and is substantially thermally isolated from the sleeve to dissipate heat generated by the electronic components.

9. The method of claim 8, including the step of:
   attaching the canister to the sleeve at a minimum number of points to permit cooling air to flow through the clearance space with minimal obstruction.

* * * * *